United States Patent
Bhesania et al.

(10) Patent No.: US 8,441,233 B2
(45) Date of Patent: May 14, 2013

(54) PROTOCOLS FOR REPORTING POWER STATUS OVER MULTIPLE BUSES

(75) Inventors: Firdosh K. Bhesania, Kirkland, WA (US); Randall E. Aull, Kenmore, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 13/437,715

(22) Filed: Apr. 2, 2012

(65) Prior Publication Data

US 2012/0246493 A1    Sep. 27, 2012

Related U.S. Application Data

(63) Continuation of application No. 11/166,365, filed on Jun. 24, 2005, now abandoned.

(51) Int. Cl.
*H02J 7/00* (2006.01)
*H02J 7/16* (2006.01)

(52) U.S. Cl.
USPC ........... 320/132; 320/137; 320/148; 320/156; 320/160; 320/DIG. 18

(58) Field of Classification Search ............ 320/132, 320/134, 135, 136, 137, 148, 149, 155, 156, 320/157, 158, 159, 160, 162, 163
See application file for complete search history.

(56) References Cited

U.S. PATENT DOCUMENTS

| | | | |
|---|---|---|---|
| 6,545,448 B1 * | 4/2003 | Stanley et al. | 320/132 |
| 6,727,708 B1 * | 4/2004 | Dougherty et al. | 324/427 |
| 6,870,349 B2 * | 3/2005 | Cook | 320/132 |
| 2003/0138690 A1 * | 7/2003 | Matsui | 429/61 |

* cited by examiner

*Primary Examiner* — Edward Tso
*Assistant Examiner* — Alexis Boateng

(57) ABSTRACT

An automated power reporting system is provided in one aspect. The system includes one or more devices that can report or transmit power status information over a bus or network. A protocol component utilizes a generalized protocol to process or convert the power status information over the network in order to facilitate power management operations for a plurality of devices. In this manner, devices that send power information can interact and exploit personal computing resources in order to better help users manage limited power resources for their respective devices.

20 Claims, 8 Drawing Sheets

PROTOCOLS FOR REPORTING POWER STATUS OVER MULTIPLE BUSES

RELATED APPLICATIONS

This application claims the benefit under 35 U.S.C. §120 of U.S. application Ser. No. 11/166,365, entitled "PROTOCOLS FOR REPORTING POWER STATUS OVER MULTIPLE BUSES" filed on Jun. 24, 2005, which is herein incorporated by reference in its entirety.

BACKGROUND

Over the past few years, more devices are starting to include batteries or other renewable/rechargeable sources of power. These devices often need to convey their power settings to a host personal computer (PC), but due to the lack of a standardized protocol with the PC, various independent hardware vendors (IHVs) choose not to implement this support. In general, there are a host of problems in the industry due to lack of consistency in the manner in which to report power. In but a few examples, these problems may include:

First, IHVs create random User Interfaces (UI): Due to the lack of a uniform or standardized manner to report battery strength for example, various IHVs choose to implement their own software on PCs to display this type of information. This level of innovation may be suitable for competition between IHVs, but often confuses the end user. Also, IHVs create software that exists in control panels, in the system tray, for instance, and often on the computer desktop for their specific hardware. Thus, the user does not have a standard location where they can navigate to see the battery strength of their respective devices, for example.

Secondly, problems include lack of reporting when power is low: Most laptops today have smart batteries that can report to the operating system (OS), through standardized calls (e.g., ACPI), the charge left in the battery. When the battery is running weak, the laptop can send a notification to the user to charge the laptop or turn it off to prevent loss of data or productivity; or can choose to take action itself (e.g., save all data and hibernate to prevent loss in terms of critically low battery).

Another problem relates to smart algorithms to prolong battery life: Since most laptops today report battery strength in a standardized way to the operating system, the OS could potentially have the opportunity to perform smarter tasks to prolong the life of the battery by performing actions like slowing down the processor, turning down WiFi radios, decreasing screen brightness, and so forth. While this can also be performed by the device itself, this operation may be computationally expensive and may not have all the information to calculate this as accurately as the PC. However, since there is no standardized procedure to report a device's charge to an operating system, there is no current process for controlling or prolonging the life of the charge on a device, for example.

Other problems with current reporting systems, is poor diagnose-ability: For instance, when a wireless device stops functioning with the PC it is very difficult to diagnose the source of the problem. If the user had a procedure to visit a common area that identified all devices around their PC and observe the battery strength on the respective devices, for instance, they may be able to observe the low power status on all devices (or receive notifications of low power) and thus, replace batteries in time. There is currently no standardized process to report an external device's battery power to a PC. Though there are a number of different values that could potentially be reported through system transports, there is currently no standardized mechanism for exploiting such values.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

A standardized protocol is provided for devices, manufactured by multiple vendors, to report charge or power status in an efficient, robust, scalable and generalized manner. Such status can be relayed to components that facilitate power management operations of the devices such as a host computing operating system, for example. By employing a generalized or standardized protocol, different vendors can transport power information to the host via the protocol while mitigating vendor software development requirements for interfacing to system platforms. They can also choose to provide vendor software for value-add differentiation that is pertinent to a specific device and not generic to all devices, if desired. Power management can include a plurality of applications that are not presently supported such as cell-phone reporting of power status to a personalized message on a computer, devices reporting to an operating system over multiple system busses with current power conditions, or exploiting computing capabilities of the host to determine available power resources of the device, for example, thus offloading computing requirements of the device.

In one aspect, devices can receive power from different sources. The devices can also extract power from a host system via a cable (e.g., bus powered over USB cable), or obtain power from a wall adapter, or have a (possibly rechargeable) internal battery, wherein the latter two scenarios are examples of self-powered devices. Industry analysis shows an increasing trend in self-powered devices over both wired buses (e.g., USB, 1394, IEEE 802.3 and so forth) and wireless buses (e.g., Bluetooth, WiFi, and so forth). A number of these devices provide capabilities to measure battery power and power draw, and report this information on the device such as having bars indicating battery strength on cell phones, for example. However, the standardized protocol enables such devices to report this battery power or status, for example, on partnered systems without also coding components on the partnered system to exploit such status. In one particular aspect, a Human Interface Device (HID) protocol can be employed as the standardized protocol to transport data reflecting how a device can report its measured battery strength and also transmit it over the HID protocol, for example. While other reporting protocols in addition to HID are possible, HID can be useful as it works across many diverse buses or networks, is scalable (allows vendors to provide device specific information if desired) and provides access to information directly to user mode applications.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent

DETAILED DESCRIPTION

A generalized power reporting protocol is provided to facilitate power management operations with numerous device applications when operating with host computing systems. In one aspect, an automated power reporting system is provided. The system includes one or more devices that can report or transmit power status information over a network or bus. A protocol component utilizes a generalized protocol to process or convert the power status information over the network or bus in order to facilitate power management operations for a plurality of devices. In this manner, devices that send power information (e.g., battery status) can interact and exploit personal computing resources in order to better help users manage limited power resources for their respective devices. The network can include personal computer busses, wireless connections, standard wired connections, and so forth if desired, when reporting the power status information to the host computing systems.

As used in this application, the terms "component," "protocol," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
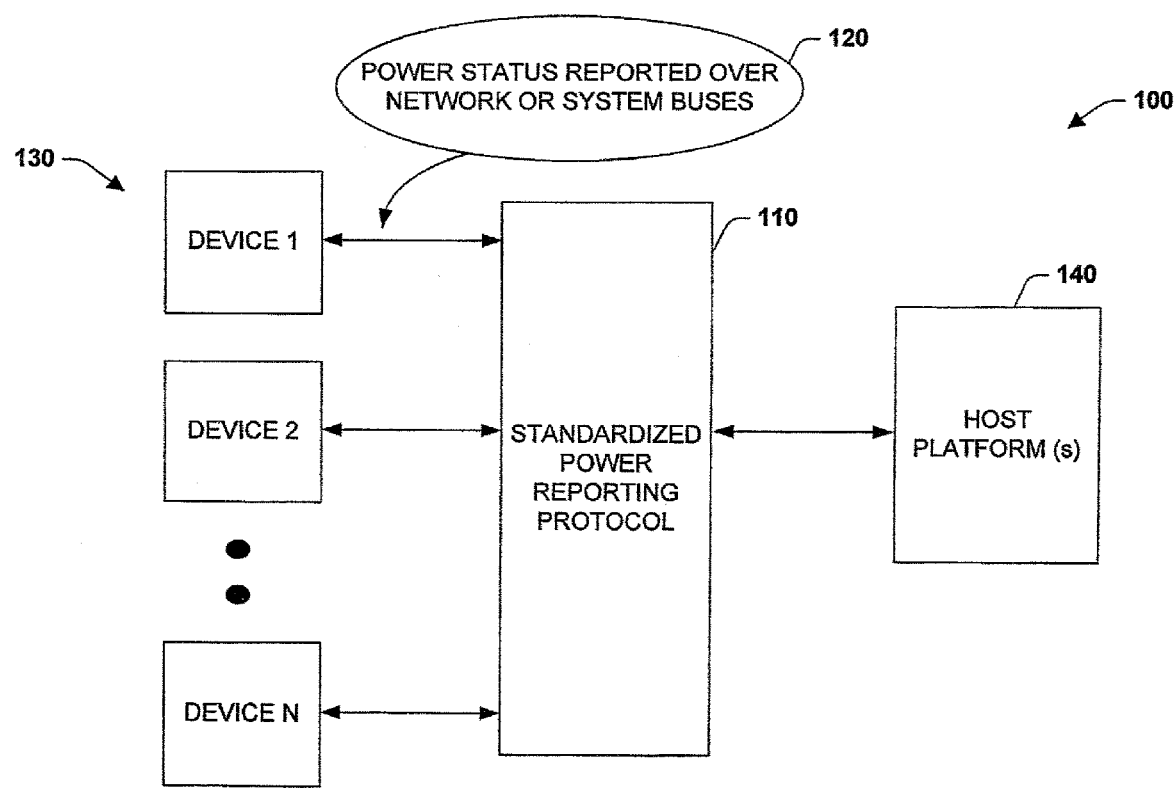
FIG. 1 is a schematic block diagram illustrating an automated power reporting and processing system.

Referring initially to FIG. 1, a system 100 illustrates automated power reporting and processing for devices. A standardized power protocol component 110 (also referred to as protocol component) relays power status 120 between one or more devices 130 and a system platform or host 140 (or hosts). Such status 120 can be transmitted over a network such as the Internet, a local area network, a wireless network, and/or across one or more computer system buses, for example, associated with the host 140. The buses could include universal serial buses, wireless buses, parallel buses, and so forth. In general, the standardized protocol 110 enables differing vendors of the devices 130 to control power management in a proprietary manner if desired, yet, still enabling reporting of device power status 120 according to prescribed interfaces of the protocol component 110. In this manner, third party hosts, platforms, and operating systems 140 can collaborate with the devices 130 to provide an enhanced user experience for managing power requirements of the devices. It is noted that the protocol component 110 can be located outside the host 140 or the devices 130, within one of these respective components, or have functionality shared between the host and the devices.

The devices 130 can be substantially any type of system or remote device such as drivers, processors, network cards, system controllers, cell phones, cameras, or substantially any type of device capable of reporting power status over remote networks or system buses such as battery strength, percentage of operating time remaining, battery trends and so forth. For instance, a cell phone could send a warning via the protocol 110 to the host, where the host sends an electronic message to the user informing them of the device's current status. In another example, the device 130 could send current battery status to the host 140 and have the host perform more complex computing tasks over time such as performing complex non-linear battery life remaining analysis when power on the device falls below a predetermined threshold. In another case, divergent operating system components could report power status to the host 140 in a unified and scalable manner for multiple devices and reported in a convenient, centralized location or interface. Another example can be more simplified where a device 130 merely reports that according to its power display, two bars of a full strength five power bar setting are remaining on the display. As can be appreciated, various applications can be supported by the protocol component 110 with more examples described below.

When status data 120 is reported across to the host 140 from the devices 130, the following describes some examples how the system 100 can use such data and provide a rich user experience. These can include:

- Single consolidated user interface (UI) to report the battery strength of all devices;
- The ability for vendors to write complex software to accurately calculate battery strength and report remaining battery life as a function of time (based on current usage activities);
- The ability to create a platform for software vendors to create applications that can read the device's battery strength and perform smart tasks with such status;
- The ability to link to consumer or vendor websites to purchase newer batteries (the type of battery needed can be reported by the device over this protocol);
- The ability to warn users that battery of a device (e.g., a cell phone in their pocket) is running low without the user having to look directly at the device;
- The ability to warn users when their batteries/device are getting weaker over multiple charging cycles, and hence be in need of replacement. Before proceeding, the following definitions are provided:
  - Human Interface Devices (HID) is a protocol definition for sending low bandwidth, tight latency data from various input and output devices. This protocol was originally specified over the USB bus, and has been expanded to other buses including Bluetooth, game port, and so forth. Some of the typical examples of HID class devices include keyboards, pointing devices, game controllers, front-panel controls, and so forth.

Independent Hardware Vendor (IHV) is an organization that develops hardware devices (e.g., cell phones, keyboards, mass storage devices, and so forth) that work with PCs.

Independent Software Vendor (ISV) is an organization that develops software (e.g., word processors, backup utilities, data synchronization utilities and so forth). ISVs generally produce applications that do not require a specific make/model of hardware. Software needed for a specific piece of hardware originates from the IHV, usually along with the device.

A battery reporting device is a device that contains a (possibly rechargeable) battery and has the capacity of measuring at least its battery strength and reporting this value to a paired device.

Figure 2:
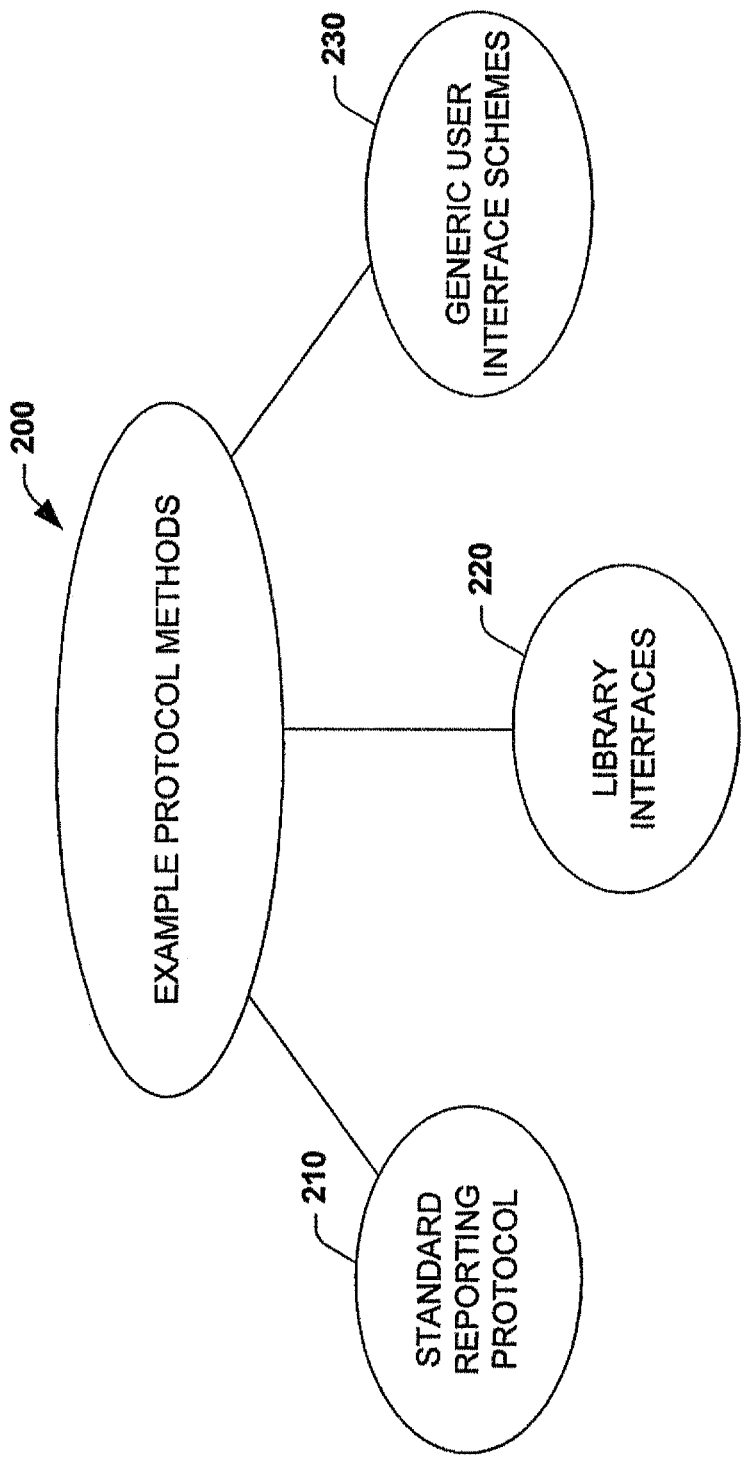
FIG. 2 illustrates exemplary protocol methods that employ device power status data.

FIG. 2 illustrates exemplary protocol methods 200 that utilize device power status data. In general, a respective device should be able to at least measure a charge stored in its battery (or other form of renewable power source) and report it to a personal computer or other host over one of the following standardized methods 200. At 210, a first method or process standardizes on certain basic and extended HID Usages, for example. A Human Interface Device (HID) protocol provides many usages (tags that identify what the power or parameter value generally should mean) to report power. A service for receiving power status can be provided or it can be read directly from a control panel, to listen to HID messages as they are generated by the device to report battery strength. In some cases (e.g., when the control panel or server is started) the operating system may request for current battery status as compared to waiting on the device for the next battery update. HID is available on various buses ranging from USB, Bluetooth, serial to Wireless USB, for example. It is also possible to run HID over 1394 and IP buses, for example. The cost of an HID endpoint (for USB—as it does not need an interrupt interface on USB) or profile (for Bluetooth, via SDP records) is low. Also, IHVs do not generally need to write any software i.e., their hardware will work out of the box and report battery strength, communicating with a standardized piece of software developed or distributed by a software vendor.

At 220, a second method creates an application interface or library from which to interact with the host. This can include creating an infrastructure (e.g., Windows Management Infrastructure) for any driver to report Battery strength. The operating system may instead choose to implement extensions for device drivers to report battery strength. The device driver does not have to be tied to any particular bus and can also function for network connected devices. This process 220 for IHVs can make existing hardware compliant with the new initiatives by writing software drivers to report battery strength. The driver can be in kernel or in user mode, for example, whereby the driver can work around defects in hardware or perform complex calibration of battery reporting before providing the charge value to the operating system.

At 230, the operating system can standardize user interfaces to report generic battery strength values (similar to the cell phone signal bars) instead of battery strength as a percentage to reduce the hit of IHVs producing lower-cost devices that can not afford to have complex battery strength readers. However an extended battery indication scheme can be employed to show more accurate battery strength indicators when implemented by IHVs. The operating system may also provide sliders to allow for users to receive notifications when the battery strength dips below a user-specified value, indicating to the user that their device needs new batteries. The operating system may also store when the last time the user updated batteries on the device (or recharged batteries) to identify life of battery if needed. In another aspect, the operating system can be provided with functionality to profile devices over time to retrieve a more accurate battery life to usage time mapping, for example. Since battery performance changes over time, identifying these trends can be enhanced by software. Also, usage patterns vary, and battery life is dependent on usage. A personal computer can track this information as well to help determine amount of battery time left.

Figure 3:
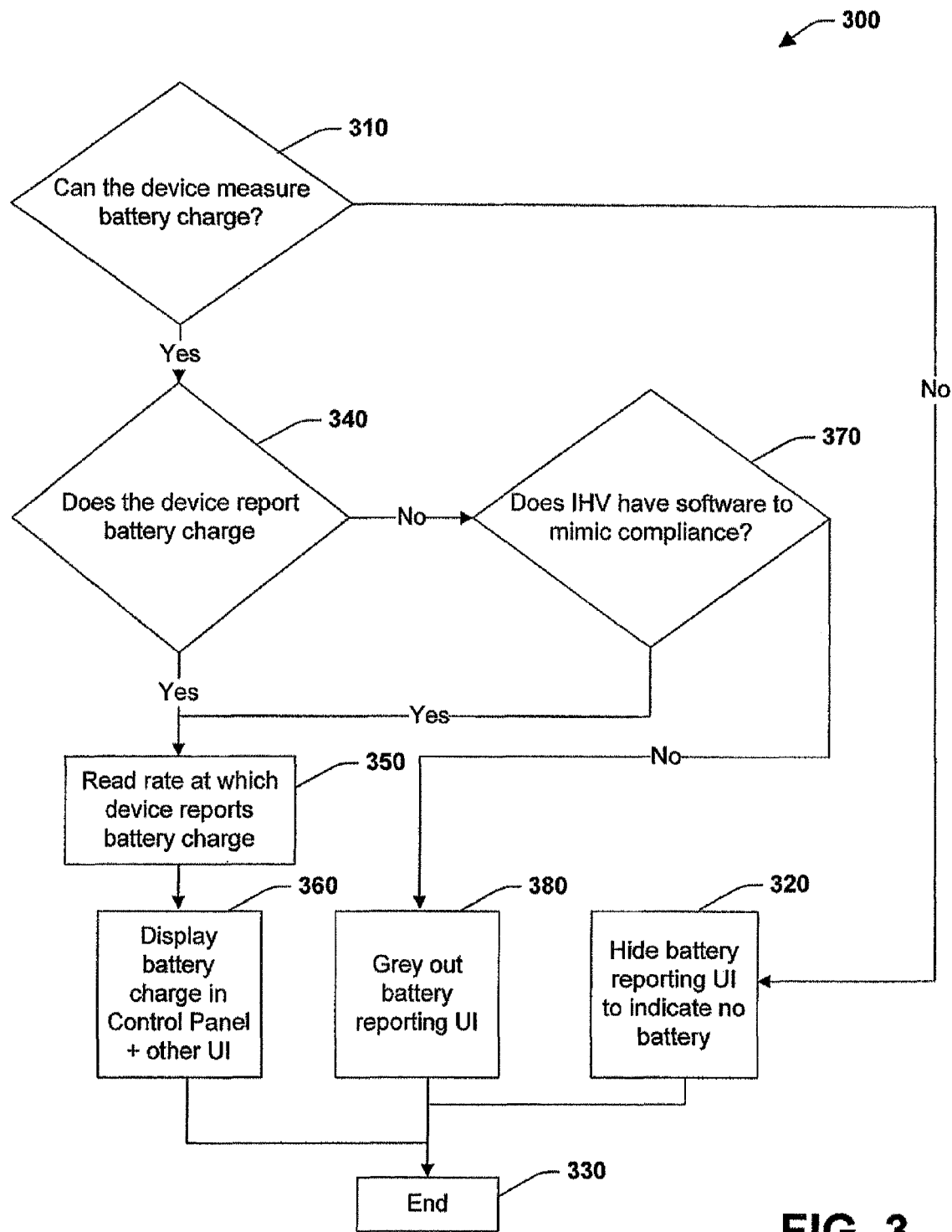
FIG. 3 illustrates a flow diagram illustrating a power reporting process.

FIG. 3 illustrates an example power reporting process 300. While, for purposes of simplicity of explanation, the methodology is shown and described as a series or number of acts, it is to be understood and appreciated that the subject process is not limited by the order of acts, as some acts may, in accordance with the subject process, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject process.

Proceeding to 310, a decision is made as to whether a device measures battery charge. If not, the process proceeds to 320, and hides a battery reporting user interface since no battery reporting capabilities are available, where the process then ends at 330. If the device can measure charge at 310, the process proceeds to 340 and determines whether or not a device reports battery charge in accordance with the standardized reporting protocol described above. If such reporting capabilities are available at 340, the process proceeds to 350 and reads the rate at which the device reports battery charge. The charge is then displayed in a control panel like display at 360 or other type user interface. If the device does not report battery charge at 340, the process proceeds to 370 to determine whether a hardware vendor has installed software to mimic compliance with standard reporting protocols. If so, the process proceeds to 350 and executes as described above. If not, the process proceeds to 380 and greys out, partially hides, or hides a battery reporting user interface before ending at 330.

Figure 4:
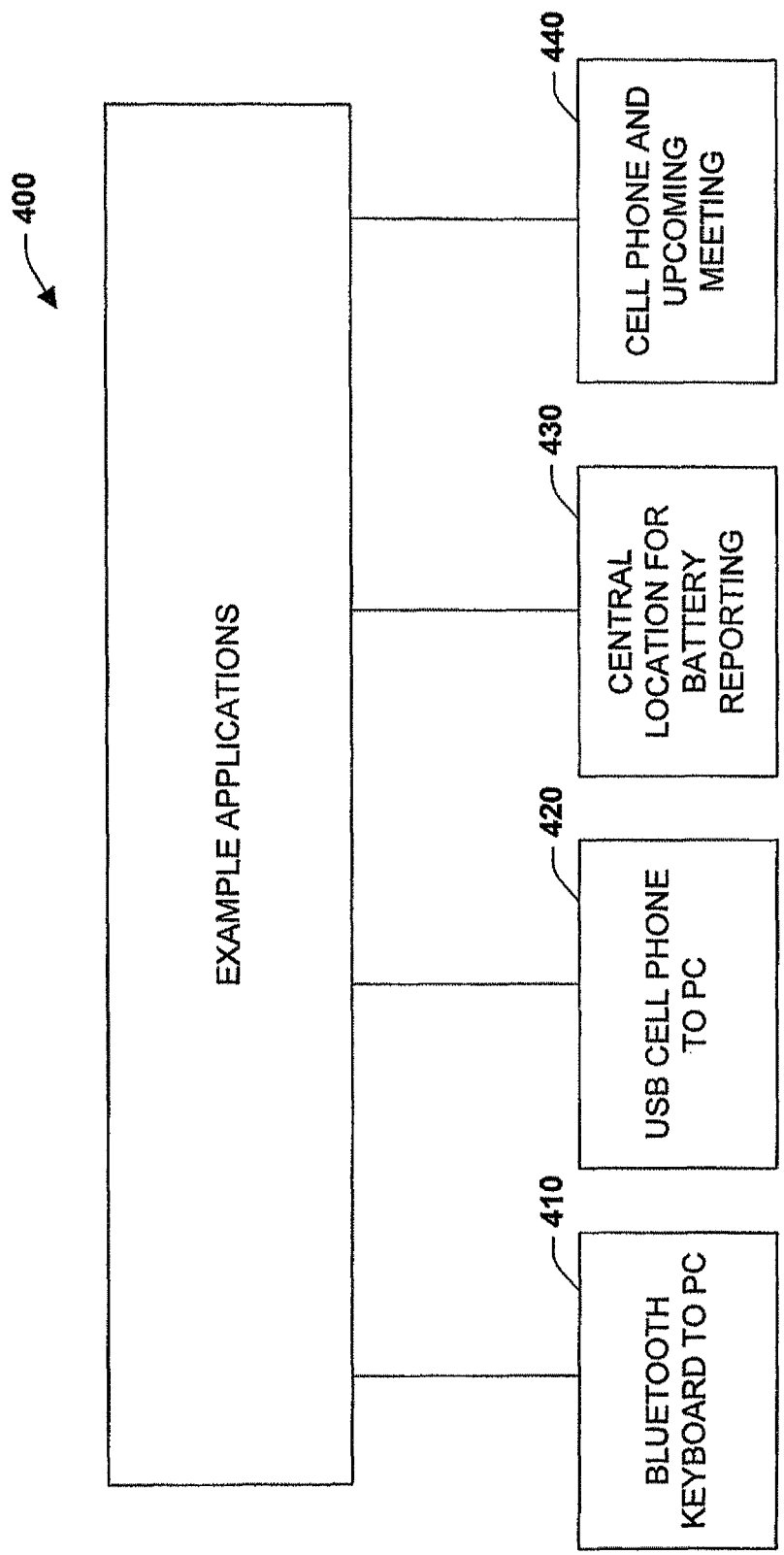
FIG. 4 illustrates example applications for power reporting in accordance with a standardized protocol.

Referring to FIG. 4, example protocol reporting applications 400 are illustrated. At 410, a Bluetooth keyboard to PC application is shown. For instance, a user purchases a new Bluetooth keyboard and brings it home. They insert batteries into the device, and follow the instructions to associate the device. Later, the user then receives an indicator that his batteries are low and needs to replace them soon. This warning allows the user to track battery strength rather than waiting until the last minute when the batteries fail and the device stops functioning without any indication to the end customer as to what went wrong.

At 420, a cell phone application is shown where a cell phone is connected to a personal computer via a USB connection. Here, the user attaches a USB cell phone to the PC to use it as a modem for internet connectivity. Then the user installs the software for the cell phone from a vendor website. This software causes the cell phone to report finer granularity of battery status. As the device is being charged, the vendor provided application shows the current strength of the battery, its charging rate and an indication (in terms of time) when the device will be fully charged/discharged at its current rate of usage.

At 430, centralized reporting of status for multiple devices is shown. In this case, the user has multiple self-powered devices connected to the PC that can each report their battery strength. They open the computer control panel, select the device viewer and observe all the hardware devices attached to the PC. Thus, in a single environment, the user sees all devices attached to their PC and also sees the battery strength reported by all devices in a unified user interface.

At 440, a cell phone application is shown. For instance, the user has a Bluetooth cell phone and the cell phone's battery usually lasts for 2 days (normal use). They charged their phone the morning before but it still has some charge left (i.e., the device is currently not reporting "critically low" battery status). Assume that the PC and the cell phone are already associated over Bluetooth. Since the PC knows the user's upcoming schedule for the day and knows that they will be traveling and attending a 4-6 pm conference call via cell phone from the road, the user receives a reminder in the afternoon to charge the phone (to last through the conference call). If there was no integration with a calendar service, for example, the user would not have received a warning to charge the phone as it was not critically low.

Figure 5:
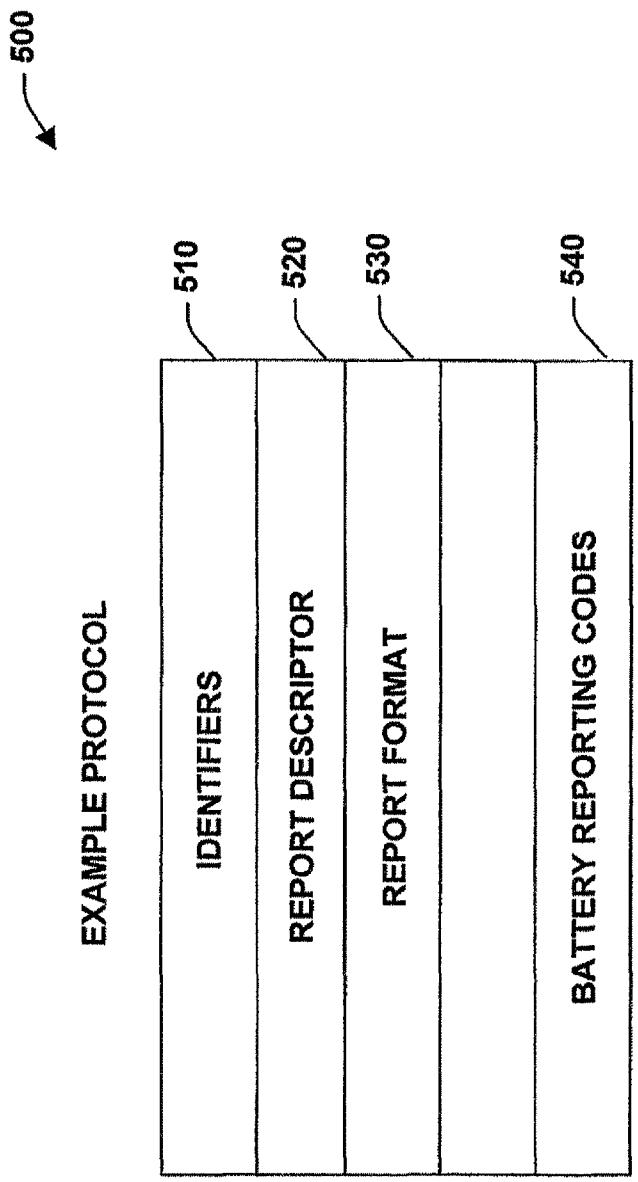
FIG. 5 illustrates an example protocol that can be employed for power reporting.

Referring to FIG. 5, an example standardized reporting protocol 500 is illustrated. The reporting protocol 500 can include a boot protocol where all battery reporting devices that desire to work with hosts should use the boot protocol mode. A device could use both the boot protocol and a report protocol to work with all hosts, if desired. At 510, the protocol may include one or more identifiers 510 as the following table defines a Class, Subclass and the Protocol code that a device reports in the specific battery reporting HID interface descriptor (note this is specific for USB but can be extended to other buses:

| Code Type | Code Value |
| --- | --- |
| Class Code | 0x03 |
| Subclass Code | 0x01 |
| Protocol Code | 0x03 |

The following example represents a report descriptor format 520 for a boot mode protocol battery reporting device. It is to be appreciated that more or less than the example parameters shown can also be provided.

Usage Page (Generic Device Controls Page),
Usage (Battery Strength),
Collection (Application),
   Report Size (8),
   Report Count (1),
   Logical Minimum (0),
   Physical Minimum (0),
   Logical Maximum (255),
   Usage (Constant—RESERVED);
   ;
   Charging or Discharging
   Report size (1)
   Physical Maximum (1)
   Logical Maximum (1)
   Usage (Charging/Discharging);
   ;
   Padding for remaining 7 bits.
   Report Size (7),
   Usage (Constant—RESERVED);
   ;
   Battery Strength
   Report size (8)
   Logical Maximum (255)
   Physical Maximum (255)
   Usage (Battery Strength)
End Collection;

At 530, one or more report formats may be employed to report battery strength and can include schemas, XML codes, wireless XML (WML), and so forth. At 540, example information that manufacturers may desire to report from the device to the host may include the following reporting codes:

| Property Title | Property Description |
| --- | --- |
| Current Operation Mode | Is the device currently charging itself or discharging itself. |
| Remaining Power - as percentage | What percentage of the battery is used up |
| Remaining Power - as time | Amount of time in mins/hours/days that the current charge will last with current usage |
| Battery Manufacturer Name | STRING - The name of the company that manufactured the battery (most likely different from final device manufacturer). |
| Battery Product Name | STRING - The name and model number of the battery (should be identical to printed model on battery). |
| Remaining Time Alarm - as percentage | Indicated the min threshold of Remaining Power - as percentage, below which the end user receive a notification. |
| Remaining Time Alarm - as time | Indicated the min threshold of Remaining Power - as time, below which the end user receive a notification. |
| Battery Serial Number | Unique serial number identifying the battery. |
| Battery Device Chemistry | Details of the chemical characteristics of the battery. This could be used by the IHV's application to predict battery charging and discharging trends. |
| Manufacturer Date of Battery | Date when the battery was manufactured |
| Universal Resource Locator (URL) | For reporting status or ordering new batteries for example |

Figure 6:
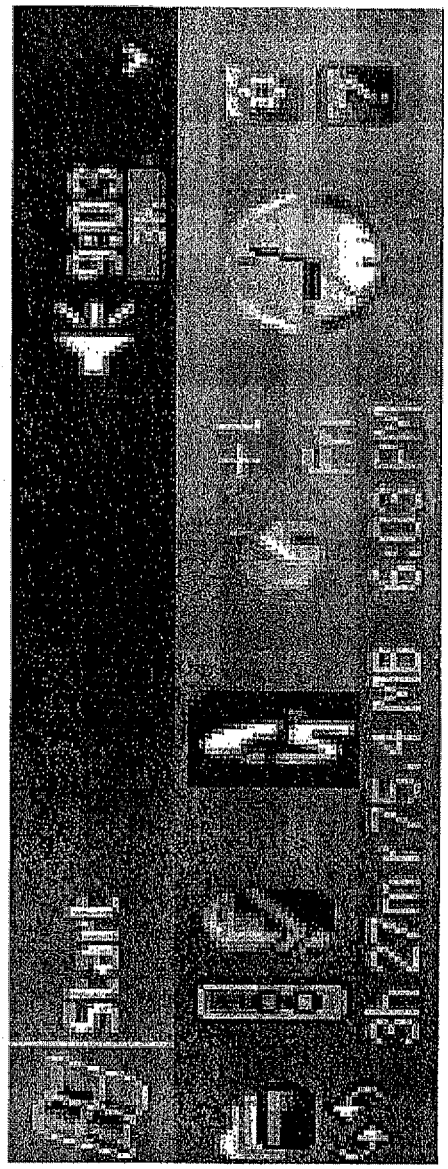
FIG. 6 is an example user interface for power reporting on a host.

Referring now to FIG. 6, an example user interface 600 is illustrated for reporting system or remote device power status in a centralized location. The interface 600 shows a PDA reporting its battery strength both in terms of the following:
   a percentage of battery charge remaining
   Number of hours left to drain (at current usage level)
   Charging or discharging status indicator.

Other features not shown could include a display reporting its battery strength via a changing bar chart and a percentage value, for example. As can be appreciated substantially any type of status can be reported in a plurality of different ways. Also, it is noted that the user interfaces described above can be provided as a Graphical User Interface (GUI) or other type (e.g., audio or video file reporting battery status). For example, the interfaces can include one or more display objects (e.g., icon) that can include such aspects as configurable icons, buttons, sliders, input boxes, selection options, menus, tabs and so forth having multiple configurable dimensions, shapes, colors, text, data and sounds to facilitate operations with the systems or devices described herein. In addition, user inputs can be provided that include a plurality of other inputs or controls for adjusting and configuring one or more aspects described herein. This can include receiving user commands from a mouse, keyboard, speech input, web site, browser, remote web service and/or other device such as a microphone, camera or video input to affect or modify operations of the various components described herein.

Figure 7:
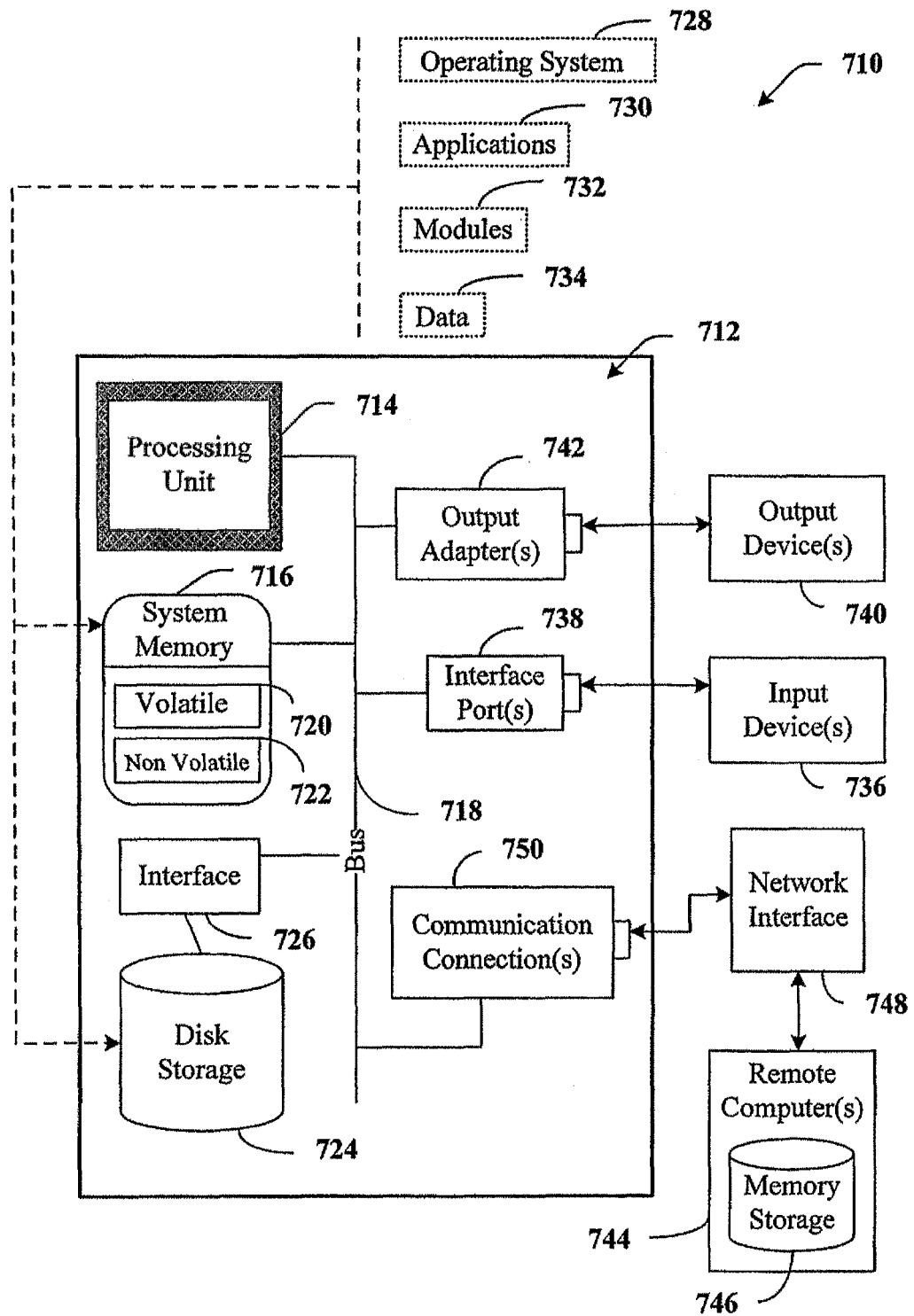
FIG. 7 is a schematic block diagram illustrating a suitable operating environment.

With reference to FIG. 7, an exemplary environment 710 for implementing various aspects described herein includes a computer 712. The computer 712 includes a processing unit 714, a system memory 716, and a system bus 718. The system bus 718 couples system components including, but not limited to, the system memory 716 to the processing unit 714. The processing unit 714 can be any of various available processors. Dual microprocessors and other multiprocessor architectures also can be employed as the processing unit 714.

The system bus 718 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 716 includes volatile memory 720 and nonvolatile memory 722. The basic input/output system (BIOS), containing the basic routines to transfer information between elements within the computer 712, such as during start-up, is stored in nonvolatile memory 722. By way of illustration, and not limitation, nonvolatile memory 722 can include read only memory (ROM), programmable ROM (PROM), electrically programmable ROM (EPROM), electrically erasable ROM (EEPROM), or flash memory. Volatile memory 720 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 712 also includes removable/non-removable, volatile/non-volatile computer storage media. FIG. 7 illustrates, for example a disk storage 724. Disk storage 724 includes, but is not limited to, devices like a magnetic disk drive, floppy disk drive, tape drive, Jaz drive, Zip drive, LS-100 drive, flash memory card, or memory stick. In addition, disk storage 724 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 724 to the system bus 718, a removable or non-removable interface is typically used such as interface 726.

It is to be appreciated that FIG. 7 describes software that acts as an intermediary between users and the basic computer resources described in suitable operating environment 710. Such software includes an operating system 728. Operating system 728, which can be stored on disk storage 724, acts to control and allocate resources of the computer system 712. System applications 730 take advantage of the management of resources by operating system 728 through program modules 732 and program data 734 stored either in system memory 716 or on disk storage 724. It is to be appreciated that various components described herein can be implemented with various operating systems or combinations of operating systems.

A user enters commands or information into the computer 712 through input device(s) 736. Input devices 736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 714 through the system bus 718 via interface port(s) 738. Interface port(s) 738 include, for example, a serial port, a parallel port, a bluetooth radio, a wireless USB or UWB radio, a game port, and a universal serial bus (USB—both wired and wireless). Output device(s) 740 use some of the same type of ports as input device(s) 736. Thus, for example, a USB port may be used to provide input to computer 712, and to output information from computer 712 to an output device 740. Output adapter 742 is provided to illustrate that there are some output devices 740 like monitors, speakers, and printers, among other output devices 740, that require special adapters. The output adapters 742 include, by way of illustration and not limitation, video and sound cards that provide a means of connection between the output device 740 and the system bus 718. It should be noted that other devices and/or systems of devices provide both input and output capabilities such as remote computer(s) 744.

Computer 712 can operate in a networked environment using logical connections to one or more remote computers, such as remote computer(s) 744. The remote computer(s) 744 can be a personal computer, a server, a router, a network PC, a workstation, a microprocessor based appliance, a peer device or other common network node and the like, and typically includes many or all of the elements described relative to computer 712. For purposes of brevity, only a memory storage device 746 is illustrated with remote computer(s) 744. Remote computer(s) 744 is logically connected to computer 712 through a network interface 748 and then physically connected via communication connection 750. Network interface 748 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 750 refers to the hardware/software employed to connect the network interface 748 to the bus 718. While communication connection 750 is shown for illustrative clarity inside computer 712, it can also be external to computer 712. The hardware/software necessary for connection to the network interface 748 includes, for exemplary purposes only, internal and external technologies such as, modems including regular telephone grade modems, cable modems and DSL modems, ISDN adapters, and Ethernet cards.

Figure 8:
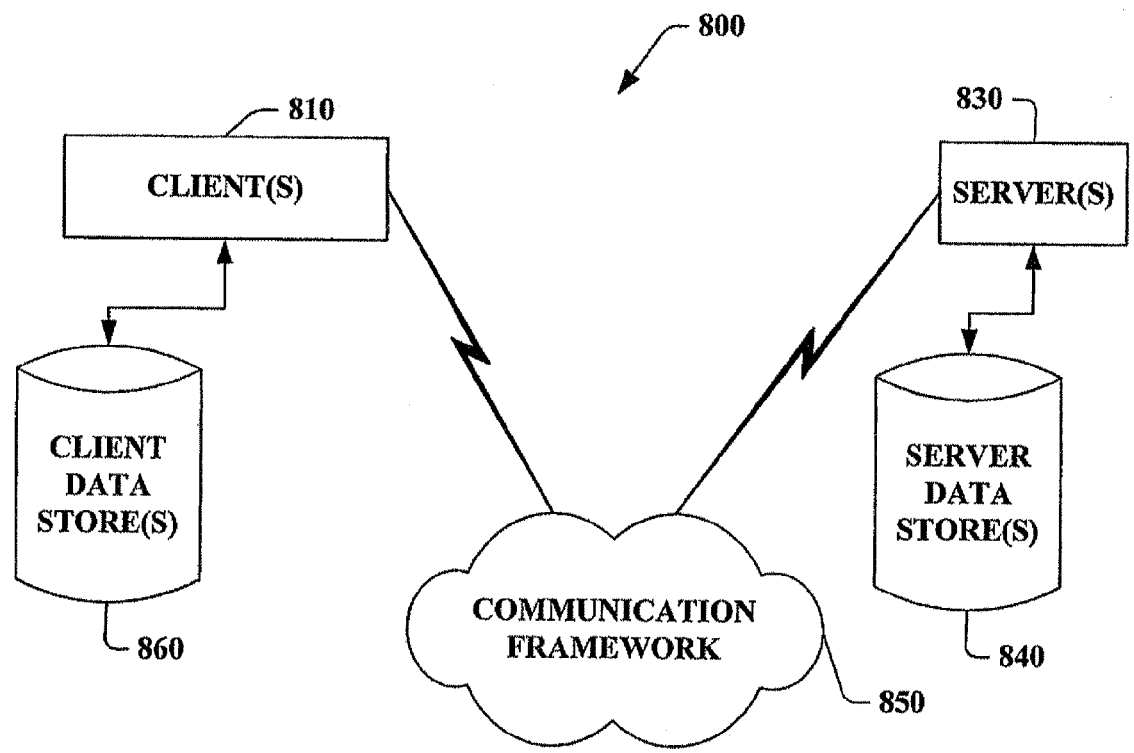
FIG. 8 is a schematic block diagram of a sample-computing environment.

FIG. 8 is a schematic block diagram of a sample-computing environment 800 that can be employed. The system 800 includes one or more client(s) 810. The client(s) 810 can be hardware and/or software (e.g., threads, processes, computing devices). The system 800 also includes one or more server(s) 830. The server(s) 830 can also be hardware and/or software (e.g., threads, processes, computing devices). The servers 830 can house threads to perform transformations by employing the components described herein, for example. One possible communication between a client 810 and a server 830 may be in the form of a data packet adapted to be transmitted between two or more computer processes. The system 800 includes a communication framework 850 that can be employed to facilitate communications between the client(s) 810 and the server(s) 830. The client(s) 810 are operably connected to one or more client data store(s) 860 that can be employed to store information local to the client(s) 810. Similarly, the server(s) 830 are operably connected to one or more server data store(s) 840 that can be employed to store information local to the servers 830.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An automated power reporting system, comprising:
    at least one computing device that receives battery data packets over a data network from a plurality of battery powered devices, the battery data packets each formatted to conform with a packet format defined according to a battery data protocol, the packet format comprising a plurality of fields corresponding to battery properties, wherein each of the battery powered devices implements the battery data protocol, each of the battery powered devices having generated a respective battery data packet therefrom by populating the fields of such a battery data packet with data about its respective battery; and
    a protocol component, executing on the computing device, that implements the battery data protocol and that processes the battery data packets received over the network.

2. The system of claim 1, the data network comprises an IP network.

3. The system of claim 1, the battery data protocol enables current battery status to be automatically sent by the battery powered devices or programmatically retrieved from the battery powered devices.

4. The system of claim 3, further comprising a threshold component that triggers a notification when one of the battery data packets contains battery data that crosses a predetermined threshold or set of thresholds.

5. The system of claim 4, wherein the set of predetermined thresholds are adjustable per battery powered device.

6. The system of claim 1, further comprising an interface that enables one or more components to be added for specific battery types or devices.

7. The system of claim 1, further comprising a component to facilitate battery life profiling that provides a representative battery status to time left mappings.

8. The system of claim 1, further comprising a user interface that displays battery status of respective batteries of the battery powered devices according to the battery data packets.

9. The system of claim 1, further comprising a component to notify a user when to charge or replace a battery of one of the battery powered devices based at least in part on a schedule and usage history corresponding to the one of the battery powered devices.

10. The system of claim 1, wherein the protocol component supports a HID boot protocol mode.

11. The system of claim 1, wherein the battery data protocol defines a field to contain at an identifier code for battery reporting.

12. The system of claim 1, wherein the protocol component includes at least one report descriptor for reporting battery powered devices.

13. The system of claim 12, wherein the report descriptor includes a usage page, a usage parameter, a collection parameter, a charging or discharging parameter, or a battery strength indication.

14. A computer readable medium having computer readable instructions stored thereon for implementing the components of claim 1.

15. A method for reporting battery data of battery powered devices in communication with a computer via a data network, comprising:
    executing a module implementing a battery data reporting protocol for battery powered devices to report power status to a host, the battery data reporting protocol defining structure of battery data packets that conform to the battery data reporting protocol, the structure including fields that are designated to contain values about respective types of battery data;
    receiving from the battery powered devices, via the network, battery data packets sent from and generated by the battery powered devices according to batteries of the battery powered devices, the battery data packets conforming to the battery data reporting protocol; and
    displaying power status of the battery powered devices at the host according to battery data values extracted from the battery data packets by the module.

16. The method of claim 15, further comprising executing an operating system service that monitors the battery data packets and reports battery status from the battery powered devices.

17. The method of claim 15, wherein the battery data reporting protocol is a human interface device (HID) protocol.

18. The method of claim 15, further comprising creating at least one device driver application programming interface extension to enable battery reporting by the battery powered devices.

19. A method for exchanging battery information between a host computing device and rechargeable computing devices, the host computing device comprising a display, a processor, and storage, the method comprising:
    implementing on the host computing device a battery protocol that is dedicated to exchanging battery information, the battery protocol defining a common format for battery data packets, the battery data packets to be used to exchange battery information, the common format including fields corresponding to battery properties;
    over a data network, exchanging the battery data packets between the host computing device and the rechargeable computing devices, the battery data packets formatted according to the battery protocol network, wherein the network is not a bus; and
    displaying on the display indicia of the batteries of the rechargeable devices, respectively, according to the received battery data packets.

20. A method according to claim 15, wherein the battery data reporting protocol comprises an application-level protocol and the battery data packets are transported through the network via a network-level protocol.

* * * * *